No. 647,888. Patented Apr. 17, 1900.
A. M. STICKNEY.
MACHINE FOR CUTTING SOLES.
(Application filed Aug. 5, 1899.)
(No Model.) 2 Sheets—Sheet 1.
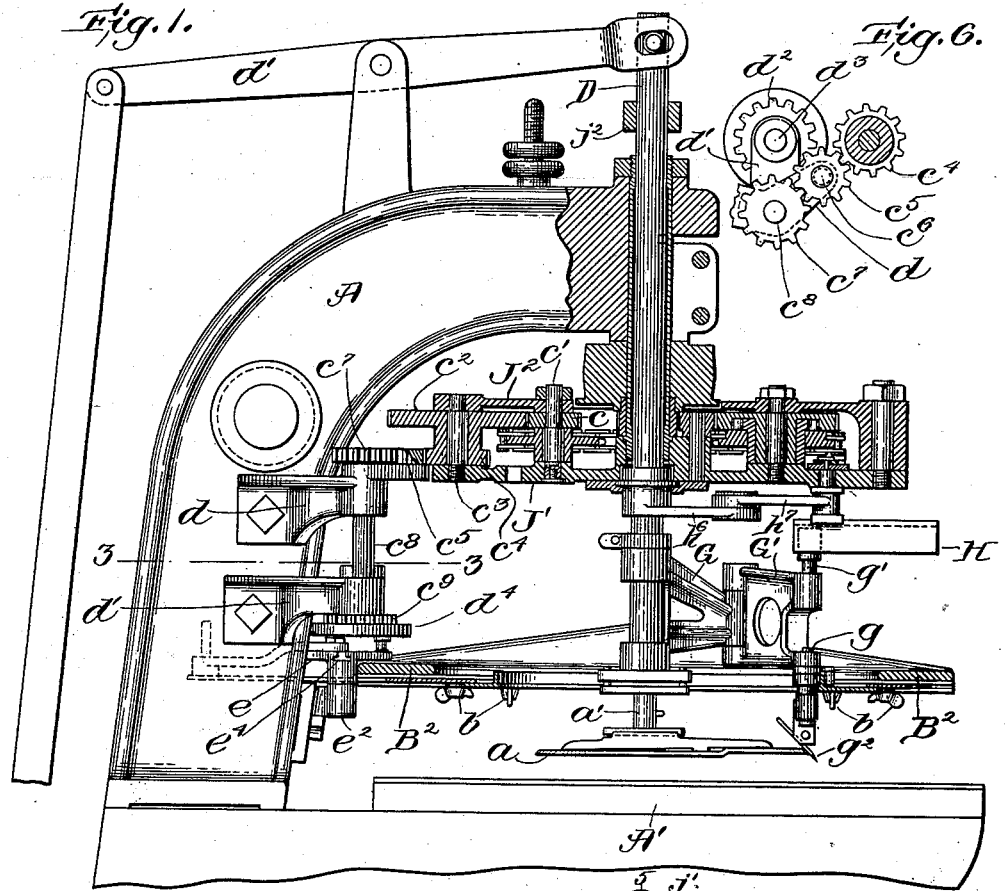
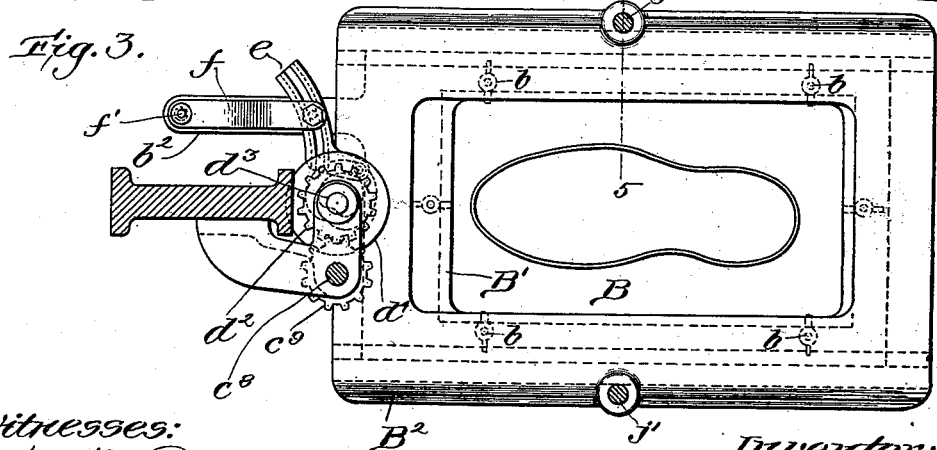
Witnesses:
Arthur D. Randall
H. Powers
Inventor:
Allison Morris Stickney,
by J. E. & Wm. Maynadier
Attorneys.

No. 647,888. Patented Apr. 17, 1900.
A. M. STICKNEY.
MACHINE FOR CUTTING SOLES.
(Application filed Aug. 5, 1899.)
(No Model.) 2 Sheets—Sheet 2.
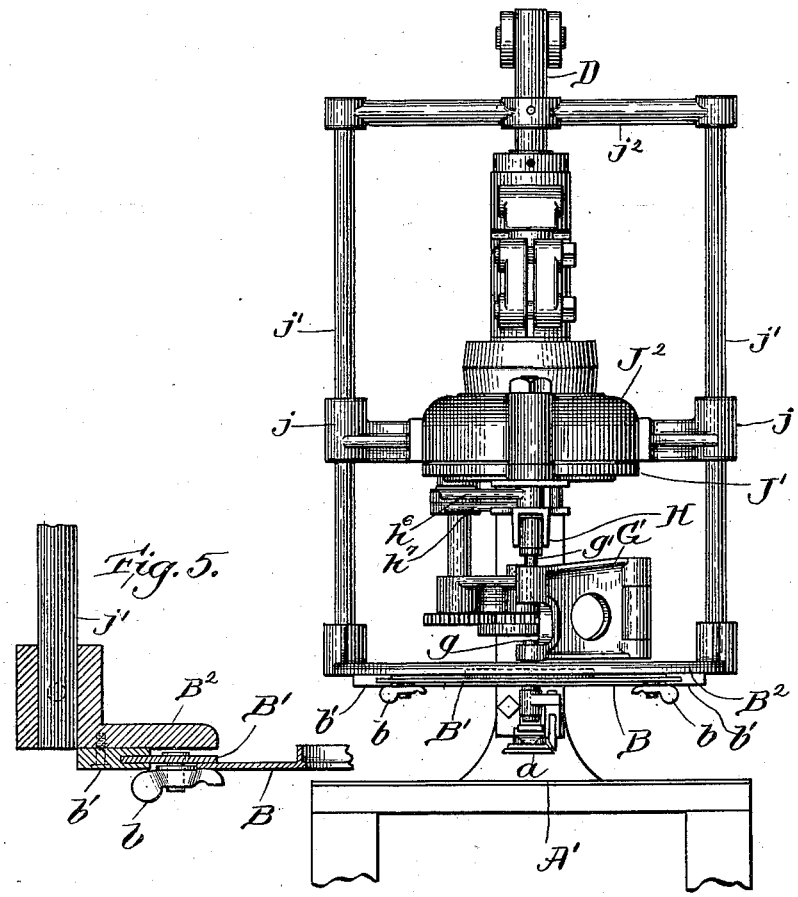
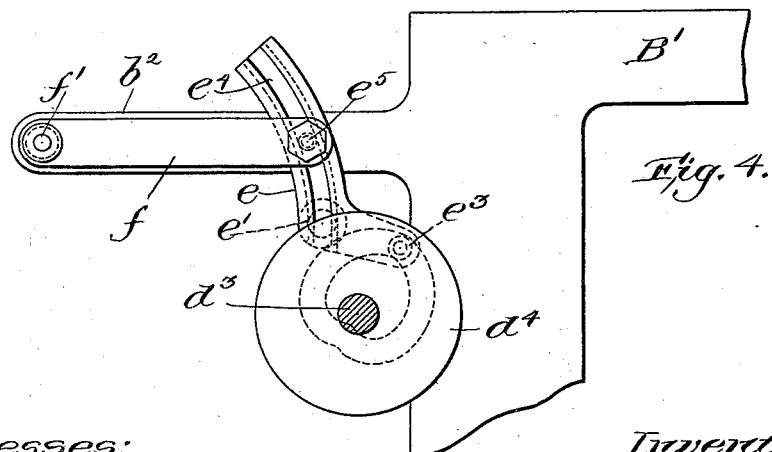
Witnesses:
Arthur F. Randall
H. Powers
Inventor:
Allison Morris Stickney.
by J.E. & Wm Maynadier
Attorneys.
THE NORRIS PETERS CO., PHOTO-LITHO., WASHINGTON, D. C.

UNITED STATES PATENT OFFICE.

ALLISON M. STICKNEY, OF MEDFORD, MASSACHUSETTS, ASSIGNOR TO THE WELLMAN SOLE CUTTING MACHINE COMPANY, OF PORTLAND, MAINE.

MACHINE FOR CUTTING SOLES.

SPECIFICATION forming part of Letters Patent No. 647,888, dated April 17, 1900.

Application filed August 5, 1899. Serial No. 726,236. (No model.)

*To all whom it may concern:*

Be it known that I, ALLISON MORRIS STICKNEY, of Medford, in the county of Middlesex and State of Massachusetts, have invented an Improved Machine for Cutting Soles or other Forms, of which the following is a specification, reference being had to the accompanying drawings, in which—

Figure 1 is a side elevation, partly in section, of a portion of one of my improved machines. Fig. 2 is a front elevation showing the same parts shown in Fig. 1. Fig. 3 is a section on line 3 3 of Fig. 1 with certain parts removed. Figs. 4 and 5 are details described below.

The machine shown is as to most of its parts fully described in my Patent No. 529,883, dated November 27, 1894, for my present invention is an improvement on the machine of that patent, and consists, mainly, in a new leader or form for guiding the knife-carrier in a path which conforms very nearly to the path of the knife, the great difference being that my new leader is a metal sheet with a sole-shaped aperture cut in it and a sinuous strip extending along the edge of the sole-shaped aperture instead of a metal sheet with a properly-shaped outline, as in my former patent. This new feature is especially important when the knife itself is guided by traveling about a form of sheet metal whose periphery is the exact path of the knife, for the reason that the axis of the guide-roll can extend through the sheet-metal leader, which enables the leader to be supported along its outer periphery in the frame in which it is detachably secured instead of being supported from a point within its periphery, as in my former patent, and as it is essential that the leader be of sheet metal it is obvious that it can be much better supported if it be, for example, a rectangular sheet with an aperture formed in it and a sinuous strip to engage the rolls than it could be if it were a strip whose periphery engaged the rolls and which was supported from a point within its periphery.

A second feature of my invention is the combination of my leader with a slide or its equivalent, by which the leader is connected to its supporting-frame in such a manner that the leader can be moved in its supporting-frame by a cam or the like, the purpose being to keep the leader stationary when the form to be cut nearly corresponds in size with the leader, but to move the leader in a direction the same as that of the knife when the knife-form is longer than the leader. In this way a leader of a given length may be used not only with knife-forms of about the same length as the leader, but also with knife-forms of practically all lengths used in the cutting of soles and taps.

In the drawings, A is the frame.

D is a rod which carries at its lower end the knife-form $a$ and its holder $a'$ and also carries the arms G G', which sustain the stud $g$ of the knife-carrier and the stud $g'$, through which the knife-carrier is driven by the grooved bar H, which is sustained by the arms $h^6$ $h^7$ and moves bodily in its proper path by mechanism in the casing $J^2$, being guided by a slot in the bottom J' of that casing and actuated through the pulley at the top of that casing, all as more fully described in my former patent, No. 529,883; but the casing $J^2$ in my improved machine has added to it the brackets $j$, through which rods $j'$ extend. These rods are fast at one end to cross-head $j^2$, which is fast to rod D, and carry at their other end frame $B^2$, so that when rod D is moved endwise (by lever $d'$, as in Patent No. 529,883) frame $B^2$, slide B', and internal leader B move with it toward and from work-support A'. The properly-shaped aperture through the rectangular sheet-metal plate B acts on the principle of a cam-leader to guide the knife-stud $g$ in its proper path, while the knife $g^2$ is guided in its path by the knife-form $a$, the knife, the knife-block, and the knife-carrier being as in Patent No. 529,883 and needing no description here except that the knife-block is movable slightly on the knife-carrier as the form $a$ requires, while the stud $g$ of the knife-carrier must move as leader B requires.

Leader B is connected by the thumb-nuts $b$ to slide B', so that it may be removed and another leader of a different style or shape substituted. The slide B' is mounted in ways $b'$, fast to frame $B^2$. Pinion $c$ is fast on a shaft $c'$, (part of the usual driving mechanism for stud $g'$,) and pinion $c$ meshes with and drives gear $c^2$, which is loose on a stud $c^3$, supported by casing $J^2$. The gear $c^2$ is fast to pinion $c^4$, and pinion $c^4$ meshes with an intermediate gear $c^5$, which is journaled on a stud $c^6$, secured to bracket $d$ and in engagement with gear $c^7$. The gear $c^7$ is fast on shaft $c^8$, which has its bearings in brackets $d$ and $d'$, and on the lower end of shaft $c^8$ is secured a gear $c^9$, which engages and drives a gear $d^2$. The gear $d^2$ is fast on shaft $d^3$, which has its bearings in bracket $d'$, and on the lower end of shaft $d^3$ is secured a cam $d^4$, which is adjustable on shaft $d^3$ for the purpose hereinafter set forth. The cam $d^4$ operates a bell-crank lever $e$, which is fulcrumed upon stud $e'$, projecting from bracket $e^2$, fast to frame A, and one arm of lever $e$ carries a cam-roll $e^3$, engaged by cam $d^4$, and the other arm is formed with a T-shaped slot $e^4$, in which a stud $e^5$ is adjustably secured. Upon the stud $e^5$ is pivoted one end of a link $f$, the other end of which is pivotally connected at $f'$ to an extension $b^2$ of slide B'. The cam $d^4$ operates to vibrate lever $e$ and through link $f$ to move slide B' and leader B to and fro in a line lengthwise of the sole-shaped hole or opening in leader B, lengthwise of the sole being cut, and in a like direction to the movement of the knife-carrier.

When a form $a$ of substantially the same length as the sole-shaped opening of leader B is on holder $a'$, the axis of stud $e^5$ is moved into a position in slot $e^4$ over the axis of stud $e'$ to thereby hold the leader stationary.

When a form $a$ of greater length than the sole-shaped opening in leader B is on holder $a'$, the cam $d^4$ is so adjusted on shaft $d^3$ as to move slide B' and leader B in a direction the same as that in which the knife-carrier is moving to thereby permit the carrier to move lengthwise of the sole being cut to an extent greater than the length of the sole-shaped opening of leader B and as the length of form $a$ requires.

The above-described mechanism is simple and compact and easily adjusted, but, as will be obvious, may be largely varied.

What I claim as my invention is—

1. In a machine for cutting forms from sheet materials a plate of sheet metal with an aperture formed in it and a sinuous strip of metal along the edge of the aperture for guiding the knife-carrier in its proper path.

2. In a machine for cutting forms from sheet material, a plate of sheet metal with an aperture of the proper shape for guiding the knife-carrier formed in it; a slide; means for detachably connecting the sheet-metal plate with the slide; a frame; ways in the frame for the slide; and automatic means to move the slide in its ways; all substantially as described.

ALLISON M. STICKNEY.

Witnesses:
ARTHUR F. RANDALL,
H. POWERS.